April 4, 1939. C. R. WAGNER ET AL 2,152,779
METHOD AND APPARATUS FOR WATER-DRIVE PRODUCTION OF MINERAL OIL
Filed July 6, 1937
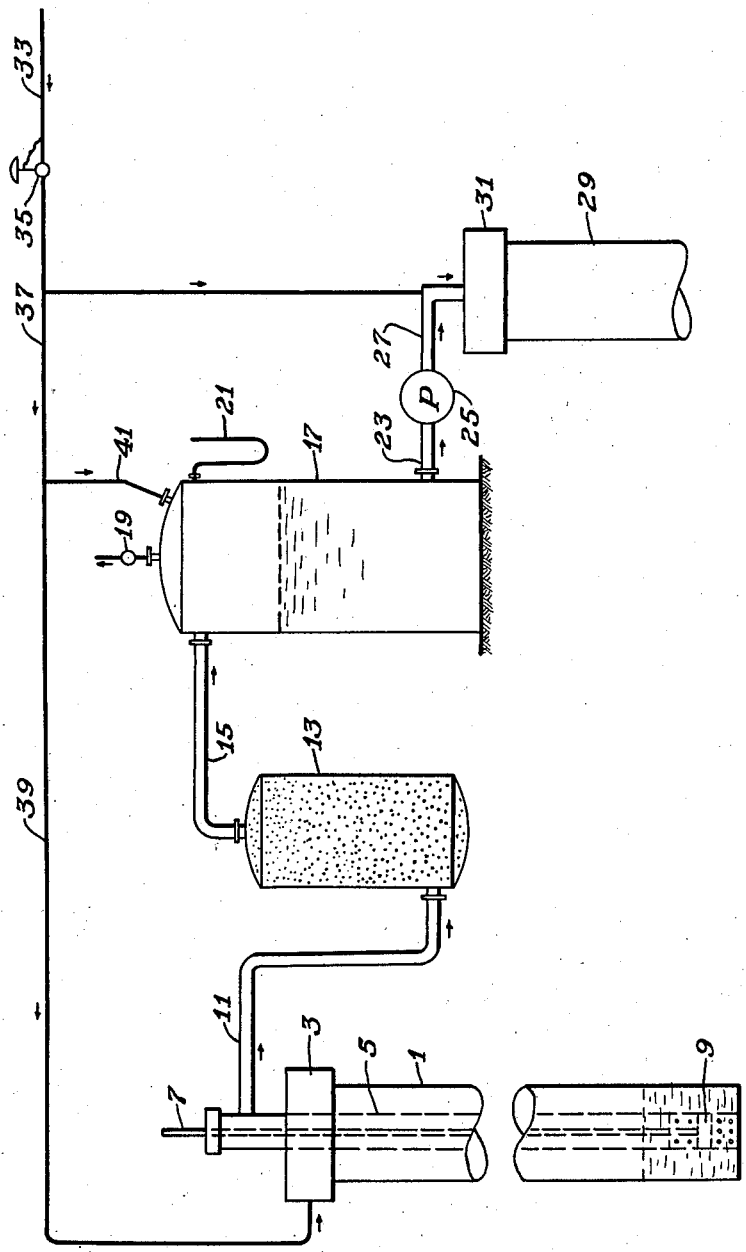
INVENTOR
Cary R. Wagner
BY Richard H. Carr
Edward H. Lang
ATTORNEY

REISSUED

Patented Apr. 4, 1939

MAY 20 1941

2,152,779

UNITED STATES PATENT OFFICE 2,152,779

METHOD AND APPARATUS FOR WATER-DRIVE PRODUCTION OF MINERAL OIL

Cary R. Wagner and Richard H. Carr, Chicago, Ill., assignors to The Pure Oil Company, Chicago, Ill., a corporation of Ohio Application July 6, 1937, Serial No. 152,087

11 Claims. (Cl. 166—21)

This invention relates to the production of mineral oil and is more particularly concerned with the problem of flooding of oil wells or the use of water drive in connection therewith.

It has become common practice in the art of producing petroleum to use water drive to increase the amount and rate of production. The water is forced under pressure into the injection well and penetrates the producing formation in the direction of the surrounding wells, thereby driving the oil toward the wells.

The water for the flooding is generally obtained by drilling one or more water wells in the vicinity of the producing wells and by pumping water from these wells to the producing wells. This water invariably contains a small percentage of iron in the form of soluble ferrous compounds, usually ferrous hydroxide. The iron content may vary from 0.5 part of iron per million parts of water to 5 or more parts of iron per million, depending upon the formation from which the water is obtained.

It is known that this iron is precipitated when pumped into the injection well and deposits on the walls of the well in the form of a gel thereby either greatly reducing the quantity of water than can be forced into the well, or making it totally impossible to inject additional water.

In order to avoid the precipitation of iron with its attendant consequences, it has been common practice to aerate the water by blowing air therethrough in tanks whereby iron is precipitated and then to filter the aerated water through beds of sand of various degrees of fineness to remove the precipitated iron and other solid material from the water. It has been considered necessary to reduce the iron content of the water below .5 part per million in order to get satisfactory results. However, it has been found that although the treatment of water in the manner just described, delays the clogging of the injecting well, it does not entirely avoid it.

It has been discovered that the difficulties hereinbefore attendant upon the use of water drive are completely overcome if the well water is injected into the injection well without any treatment and air is entirely excluded from contact with the water. It has further been discovered that the iron present in solution in the well water will remain in solution after injection into the injection well provided the well is blanketed with an inert gas such as carbon dioxide, nitrogen, or natural gas. Precipitation does not take place under such conditions and the well remains entirely free from clogging thereby permitting injection of large quantities of water and increasing the production of oil in the surrounding wells.

As long as the iron is maintained in the ferrous state it is soluble in the water in the quantities in which it is present. But upon oxidation to the ferric state, compounds, such as ferric hydroxide, are formed which are insoluble in the proportion in which they are present. These ferric compounds cause the clogging of the well. Even when the water is aerated and filtered it apparently retains or picks up additional iron, which precipitates in the well. Efforts to remove occluded air from the water after aeration and filtration by means of vacuum have not remedied the difficulty. The iron which is picked up is probably due to corrosion of the pipe line and to solution of ferrous iron in the water.

In carrying out the invention, water is pumped from the water well to the injection well under a blanket of natural gas which is obtained from storage or directly from wells in the vicinity. A small gas pressure is kept above the water in the water wells as well as above the water in the injection wells. In this manner, access of air to the water is prevented and the water, therefore, passes unchanged from one well to the other.

The accompanying drawing, the single figure of which is a diagrammatic side elevational view, illustrates apparatus suitable for carrying out the invention.

Referring to the drawing, the numeral 1 represents a water well closed at the top by means of closure member 3 in order to prevent access of air into the well. Tubing 5 extends through the closure to the bottom of the well. A polish rod 7, located inside the tubing 5, has a pump 9 fastened to the lower end thereof. The polish rod is adapted to be reciprocated up and down in the tubing 5 and is properly packed at the point where it passes through the upper end of the tubing in order to prevent leakage of air into the tubing.

The upper end of tubing 5 is connected by means of conduit 11 to an air tight sand filter 13 which may preferably be made up of successive layers of sand, each of finer mesh than the next lower layer. In passing through the sand bed, any suspended material present in the water is removed. It is desirable to remove suspended matter since it clogs up the minute pores in the producing formation. The filtered water leaves the top of the sand filter through conduit 15 and passes to closed storage tank 17. The top of the tank is provided with a safety pop valve 19 to relieve excess pressure in the tank. The tank is also provided with a U-tube 21, sealed with oil, in order to determine the level of the water in the tank.

A conduit 23 connects the lower portion of tank 17 with a pump 25 which in turn is connected by conduit 27 to the top of an injection well 29. The top of the well 29 is closed by closure or cap 31 to prevent air from entering the well.

The line 33 is connected to any suitable source of inert gas, as for example, a tank of natural gas. A pressure regulator 35 permits the gas to flow from the gas source at a fixed pressure. In this particular case, a pressure of ¼ pound above atmospheric has been found satisfactory. From the line 33 the gas enters manifold 37 from which it is distributed to line 39 entering the top of the water well, line 41 entering the top of water tank 17, and conduit 27 through which both gas and water flow into injection well 29. The maintenance of a blanket of inert gas above the water in the wells and in the storage tank, at a pressure slightly above atmospheric, insures against leakage of air into contact with the water.

Thus, in accordance with this invention, water containing relatively large amounts of soluble iron compounds can be injected directly into earth bores without running any risk of clogging the bore hole. This discovery not only eliminates the use of expensive treating methods but actually enables the production of larger amounts of oil because of the large amounts of water that can be forced through the producing strata.

What is claimed is:

1. In the transfer of water into an earth bore, the method of preventing clogging of said earth bore into which is injected said water containing soluble compounds which precipitate upon oxidation which comprises maintaining the water at its source under a blanket of inert gas, transferring the water from its source to the injection bore in the absence of air or oxygen, and injecting the water, without treatment to remove said compounds therefrom, into the injection bore under a blanket of inert gas.

2. The method of flooding oil-bearing formations which comprises withdrawing water from a well maintained under a blanket of inert gas, transferring the water through a closed conduit to a closed container in which the water is maintained under an atmosphere of inert gas, transferring water from said container through a closed conduit to a water injection well maintained under a blanket of inert gas, all without removing from said water any soluble iron compounds.

3. Method in accordance with claim 2 in which the water is filtered in the absence of air prior to injection into the injection well.

4. Apparatus for transferring subsurface water from one deep well to another which comprises a pump located in one of said wells, the top of said well being closed off from the atmosphere, a closed conduit from said well to a closed tank, a second conduit from said tank to the other of said wells, a closure on the top of said well to prevent access of air, a gas holder, conduits from said gas holder to the tops of said wells and to said tank, and automatic means for releasing pressure in said tank.

5. Apparatus in accordance with claim 4 including a filter in the conduit from the first mentioned well to said tank.

6. In the flooding of oil-bearing formations with water containing appreciable quantities of compounds which precipitate upon oxidation, the steps of maintaining the water at its source under a blanket of inert gas, transferring the water from its source to the injection bore in the absence of air or oxygen, and injecting the water without treatment to remove oxidized precipitated compounds therefrom, into the injection bore under a blanket of inert gas.

7. In the transfer of water containing appreciable quantities of iron compounds in solution into an earth bore, the method of preventing clogging of said earth bore into which is injected said water which comprises maintaining said water under a blanket of inert gas and transferring said water from its source to the earth bore, in the absence of air or oxygen, without subjecting it to treatment to remove iron or its compounds.

8. In the flooding of oil-bearing formations with water containing appreciable quantities of iron compounds in solution the steps of maintaining the source of water under a blanket of inert gas, transferring the water from the source to an injection well through a closed conduit in the substantial absence of air or oxygen and injecting the water into the injection well under a blanket of inert gas without removing from the water any of its iron content.

9. Method in accordance with claim 1 in which the water is filtered in the absence of air prior to injection into the injection bore.

10. Method in accordance with claim 1 where the blanket of inert gas is composed of hydrocarbon gases.

11. Method in accordance with claim 1 where the blanket of inert gas is composed of carbon dioxide.

CARY R. WAGNER.
RICHARD H. CARR.